(12) United States Patent
Terada et al.

(10) Patent No.: US 7,609,202 B2
(45) Date of Patent: Oct. 27, 2009

(54) RELATIVE MEASUREMENT METHOD AND RELATIVE MEASUREMENT SYSTEM USING SATELLITE

(75) Inventors: Yukihiro Terada, Osaka (JP); Keiji Ito, Osaka (JP); Takenori Abe, Osaka (JP); Takashi Fujita, Osaka (JP)

(73) Assignee: Hitachi Zosen Corporation, Osaka-shi, Osaka (JP)

( * ) Notice: Subject to any disclaimer, the term of this patent is extended or adjusted under 35 U.S.C. 154(b) by 207 days.

(21) Appl. No.: 11/666,256

(22) PCT Filed: Oct. 29, 2004

(86) PCT No.: PCT/JP2004/016148

§ 371 (c)(1),
(2), (4) Date: Apr. 25, 2007

(87) PCT Pub. No.: WO2006/046305

PCT Pub. Date: May 4, 2006

(65) Prior Publication Data

US 2007/0264970 A1    Nov. 15, 2007

(51) Int. Cl.
*G01S 5/14* (2006.01)
*G01C 21/30* (2006.01)

(52) U.S. Cl. .................. 342/357.08; 342/357.03; 701/208

(58) Field of Classification Search ................................
342/357.01–357.012, 357.03, 357.08; 701/208
See application file for complete search history.

(56) References Cited

U.S. PATENT DOCUMENTS 6,434,509 B1   8/2002   Tsuchiya et al. ............ 702/158
7,231,295 B2 *  6/2007  Pickett et al. ............... 701/208
7,248,211 B2 *  7/2007  Hatch et al. ............ 342/357.03
7,482,974 B2 *  1/2009  Ogawa et al. .......... 342/357.08

FOREIGN PATENT DOCUMENTS

| JP | 9-61509      | 3/1997  |
| JP | 11-063984    | 3/1999  |
| JP | 2001-174259  | 6/2001  |
| JP | 2001-281323  | 10/2001 |
| JP | 2002-181917  | 6/2002  |
| JP | 2004-144622  | 5/2004  |
| JP | 2004-286626  | 10/2004 |
| JP | 2004-301598  | 10/2004 |

\* cited by examiner

*Primary Examiner*—Thomas H Tarcza
*Assistant Examiner*—Harry Liu
(74) *Attorney, Agent, or Firm*—Kusner & Jaffe (57) ABSTRACT

A measuring system wherein radio waves from a GPS satellite (4) are received by a reference station (1) and a plurality of mobile stations (3) to perform relative measuring among particular stations, thereby measuring the shift amounts of the mobile stations (3). At least one of the mobile stations (3) is disposed such that a baseline limit length allowing relative measuring relative to the reference station (1) is exceeded, and the intervals between particular mobile stations (3) are shorter than the baseline limit length allowing relative measuring. Each of the stations (1, 3) is equipped with a GPS receiver (11, 21) that receives the radio waves from the GPS satellite (4), and further equipped with a wireless communication apparatus (12, 22) that transmits/receives data to/from a particular station. There are provided a relative shift amount calculation part (32) for calculating the relative shift amount between the particular stations; and a reference relative-shift-amount calculation part (33) for determining, based on a reference relative-shift-amount of one station that performs a relative measuring, a reference relative-shift-amount of the other station.

5 Claims, 7 Drawing Sheets

RELATIVE MEASUREMENT METHOD AND RELATIVE MEASUREMENT SYSTEM USING SATELLITE

FIELD OF THE INVENTION

The present invention relates to a relative measurement method and relative measurement system for using radio waves from a plurality of satellites and detecting displacement by relative measurement.

BACKGROUND OF THE INVENTION

As a satellite position measurement technology for receiving and analyzing radio waves from a plurality of satellites and detecting a position of a receiver (hereafter called "mobile station"), a single position measurement system for measuring position by a solo mobile station even if the measurement error is large, and a relative position measurement system for accurately determining the position of a mobile station using the correction data from a reference station of which position is known, are available.

In the relative position measurement system, the position measurement accuracy is restricted by the linear distance between receivers, which is the so called "base length".

For example, in the case of a relative position measurement system which measures the position independently using the C/A code of GPS (Global Positioning System) and corrects the position using the correction data, the limit of the base length, when the uncertainty of orbit information of the satellite and the error due to the ionosphere and atmosphere etc. are approximately the same for each receiver, is about 100 km or less, and an error can be offset within this range, so an improvement of position measurement accuracy in the relative position measurement system can be expected.

On the other hand, in the case of a system which analyzes the base line using a carrier phase so as to improve the position measurement accuracy, the limit of the base line is short, about 10 km or less, but the position measurement accuracy improves dramatically since a carrier phase, which is sufficiently shorter than the C/A code, is used [e.g. see the new edition of GPS-Precision Positioning System by Satellites (issued by Japan Survey Association)].

An example of a relative measurement system for measuring a relative displacement of a mobile station using radio waves from satellites has been disclosed in Japanese published patent application (2001-281323), and this can measure the displacement at an accuracy equivalent to a kinematic system.

SUMMARY OF THE INVENTION

In the case of the relative position measurement system and the relative measurement system mentioned above, however, relative position measurement or relative measurement cannot be used in an area in a range where the base line limit length from any reference station can be used, and the reference station is not organized, no matter where the mobile station is located, whether on land, ocean or in the sky, so position or displacement cannot be measured accurately.

An advantage of the present invention is a relative measurement method and a relative measurement system using satellites that can use relative measurement, even for a mobile station located outside the base length that allows relative measurement.

The relative measurement method using satellites according to the present invention is a measurement method for forming a relative measurement network for performing a relative measurement between predetermined stations by receiving radio waves from satellites by a reference station and a plurality of mobile stations, and measuring a reference relative displacement, which is a relative displacement of each mobile station viewed from the reference station, wherein at least one of the mobile stations is disposed so as to exceed a base line limit length that allows a relative measurement with the reference station, and a space between predetermined mobile stations is set to be a base line limit length that allows relative measurement or less than the base line limit length, the relative measurement method comprising: a reference relative displacement computing step of computing a reference relative displacement between the reference station and the predetermined mobile station; an inter-mobile station relative displacement step of computing an inter-mobile station relative displacement, which is a relative displacement between the predetermined stations; and a conversion step of converting the inter-mobile station relative displacement determined in the inter-mobile station relative displacement computing step into the reference relative displacement based on a reference displacement in the reference station.

The relative measurement system according to the present invention is a measurement system for forming a relative measurement network for performing a relative measurement between predetermined stations by receiving radio waves from satellites by a reference station and a plurality of mobile stations, and measuring a reference relative displacement, which is a relative displacement of each mobile station viewed from the reference station, wherein at least one of the mobile stations is disposed so as to exceed a base line limit length that allows relative measurement with the reference station, and a space between predetermined mobile stations is set to be a base line limit length that allows relative measurement or less than the base line limit length, a satellite measurement device for receiving radio waves from satellites is installed in each of the stations, a radio communication device for transmitting and receiving data to/from a predetermined station is installed in each of the stations, and the relative measurement system is provided with a relative displacement computing section for computing a relative displacement between the predetermined stations, and a reference relative displacement computing section for determining a reference relative displacement of another mobile station based on a reference relative displacement of one station that performs a relative measurement.

It is preferable that a reference relative displacement computing section in the relative measurement system is disposed in the reference station, and the reference relative displacement of the mobile station is sequentially determined.

It is also preferable that a reference relative displacement computing section for computing each reference relative displacement is disposed in each mobile station in the relative measurement system.

It is also preferable that the relative measurement in the relative measurement system is performed using a carrier phase.

According to the relative measurement method and relative measurement system, a network which sequentially places mobile stations from a reference station with a predetermined space so as to be less than a base line limit length that allows relative measurement and performs linked relative measurement is formed, and the relative displacement between each station is determined, and also the reference relative displacement of each mobile station is sequentially determined from upstream to downstream of the network using the reference relative displacement, which is a displacement viewed from the reference station of the mobile station of which relative displacement with the reference station was measured, so the reference relative displacement of a mobile station which is distant from the reference station, more than the base line limit length that allows relative measurement, can be more accurately determined by the relative measurement via the mobile station disposed therebetween.

For example, by disposing each mobile station on a floating body located on a sea surface in a sea area distant from the reference station on the ground, the coming of a tsunami can be known at a sea area distant from the coast line based on the reference relative displacement of each mobile station, and tsunami related damage can be minimized.

DETAILED DESCRIPTION OF PREFERRED EMBODIMENTS

A relative measurement system and relative measurement method using satellites according to the present invention will now be described.

In the present embodiment, a case of measuring relative displacement viewed from a reference station of a floating body, which is moored on a sea surface for detecting the displacement of the sea surface (hereafter called "reference relative displacement") as a measurement target, using radio waves and signals from GPS (Global Positioning System) satellites, which is one measurement system that uses satellites, will be described.

Embodiment

The relative measurement system and relative measurement method using satellites according to the present embodiment will now be described with reference to FIG. 1 to FIG. 6.

Figure 1:
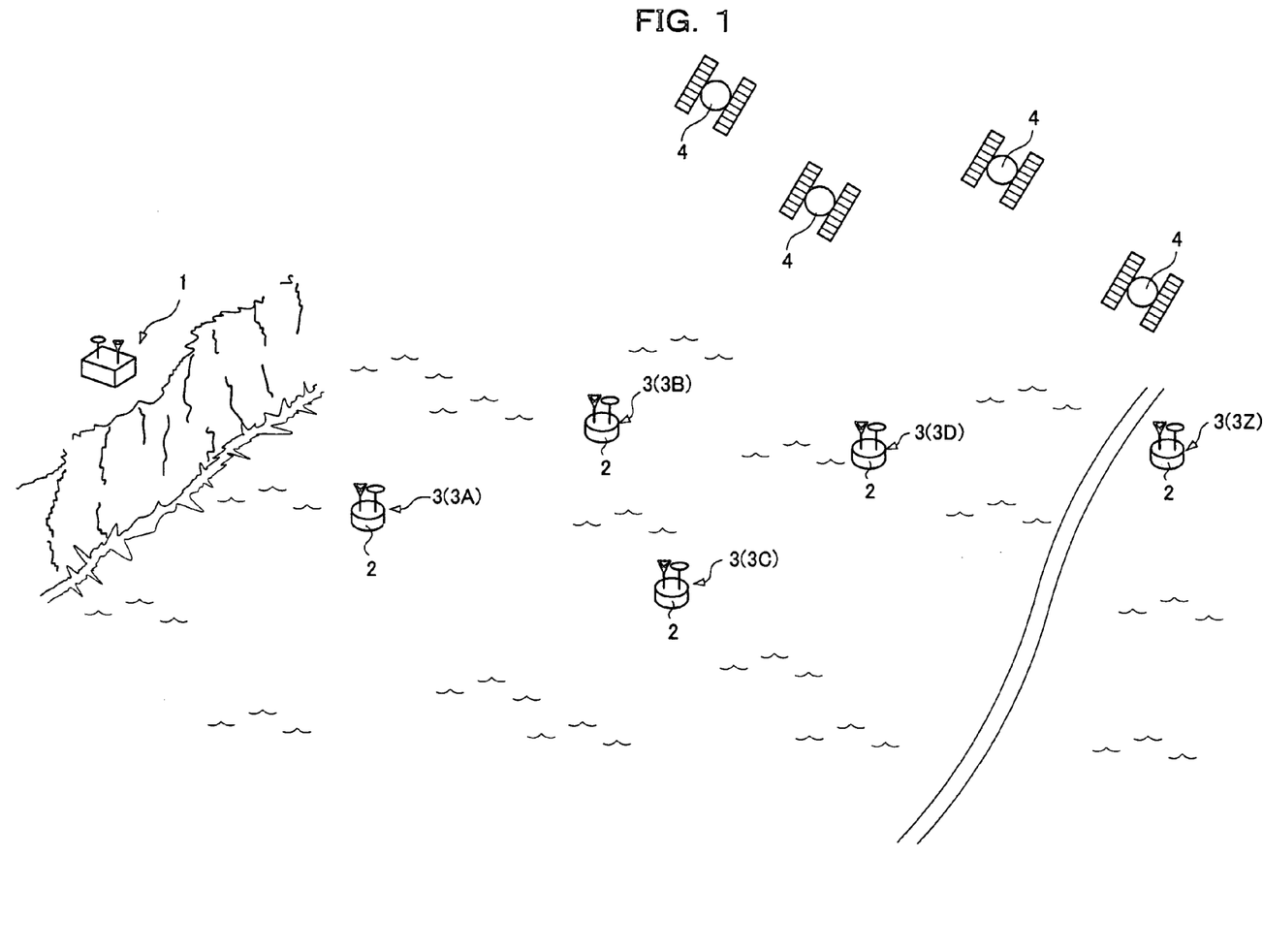
FIG. 1 is a perspective view depicting an entire configuration of the relative measurement system according to an embodiment of the present invention.

This relative measurement system comprises a reference station 1 fixed on a land of which the absolute three-dimensional position is known, and a plurality of mobile stations 3 installed on a plurality of floating bodies (buoy) 2 sequentially moored on a sea surface with a predetermined space from the center of the reference station 1 to offshore in a sea area for detecting the displacement of sea level viewed from the reference station 1, as shown in FIG. 1, and each of the stations 1 and 3 has a function for determining a relative displacement of each mobile station 3 (called "reference relative displacement" in the case of relative measurement of the reference station, and called "inter-mobile station relative displacement" in the case of measurement between mobile stations), using an after-mentioned precision fluctuation measurement system (which uses a carrier phase, hereafter called "KVD system") receiving radio waves from GPS satellites 4.

For each mobile station 3, it is assumed that one closest to the reference station 1 is called the "first mobile station 3A", and the one closer to the reference station 1 next is sequentially called the "second mobile station 3B, third mobile station 3C, . . . ," and the one most distant from the reference station 1 is called the "nth mobile station 3Z".

As mentioned above, each station is disposed with a predetermined space, and, for example, the spaces between the reference station 1 and the first mobile station 3A, between the first mobile station 3A and the second mobile station 3B, between the second mobile station 313 and the third mobile station 3C . . . and between the n−1th mobile station 3Y and the nth mobile station 3Z are set to be the base length which allows measurement in a KVD system (hereafter called "base line limit length", which is 10 km, for example) or less, and a relative measurement network is formed among the stations with the reference station to perform the relative measurement upstream, and at least the mobile station 3, most distant from the reference station 1, is installed on a floating body 2 at a position which exceeds the base line limit length from the reference station 1. Certainly the space between each station may be a same length or different length, as long as it is the base line limit length which allows measurement in a KVD system or less than the base line limit length.

Figure 2:
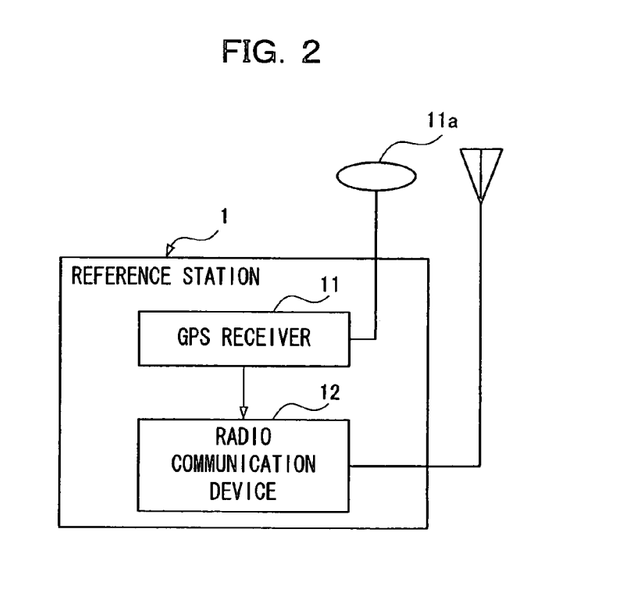
FIG. 2 is a block diagram depicting a general configuration of a reference station in this relative measurement system.

As shown in FIG. 2, the reference station 1 comprises a GPS receiver (an example of a satellite measurement device) 11 for receiving radio waves from the GPS satellite 4 via the antenna 11a and measuring the satellite data for measurement, and a radio communication device (further comprises a transmitter and receiver) 12 which transmits/receives various data, including at least the satellite data for measurement, measured by the GPS receiver 11, with another mobile station 3.

Figure 3:
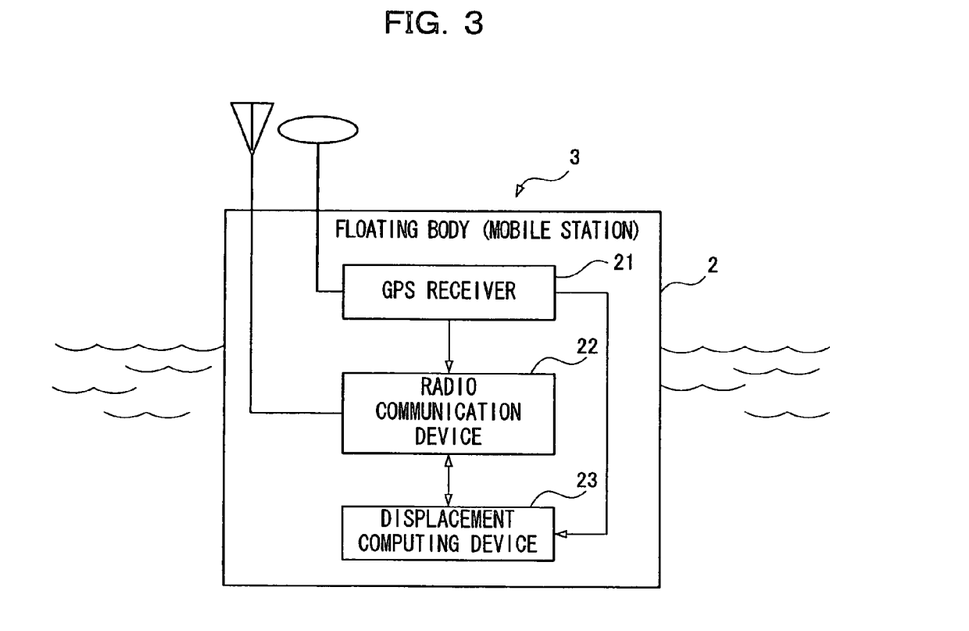
FIG. 3 is a block diagram depicting a general configuration of a mobile station in the relative measurement system.
Figure 4:
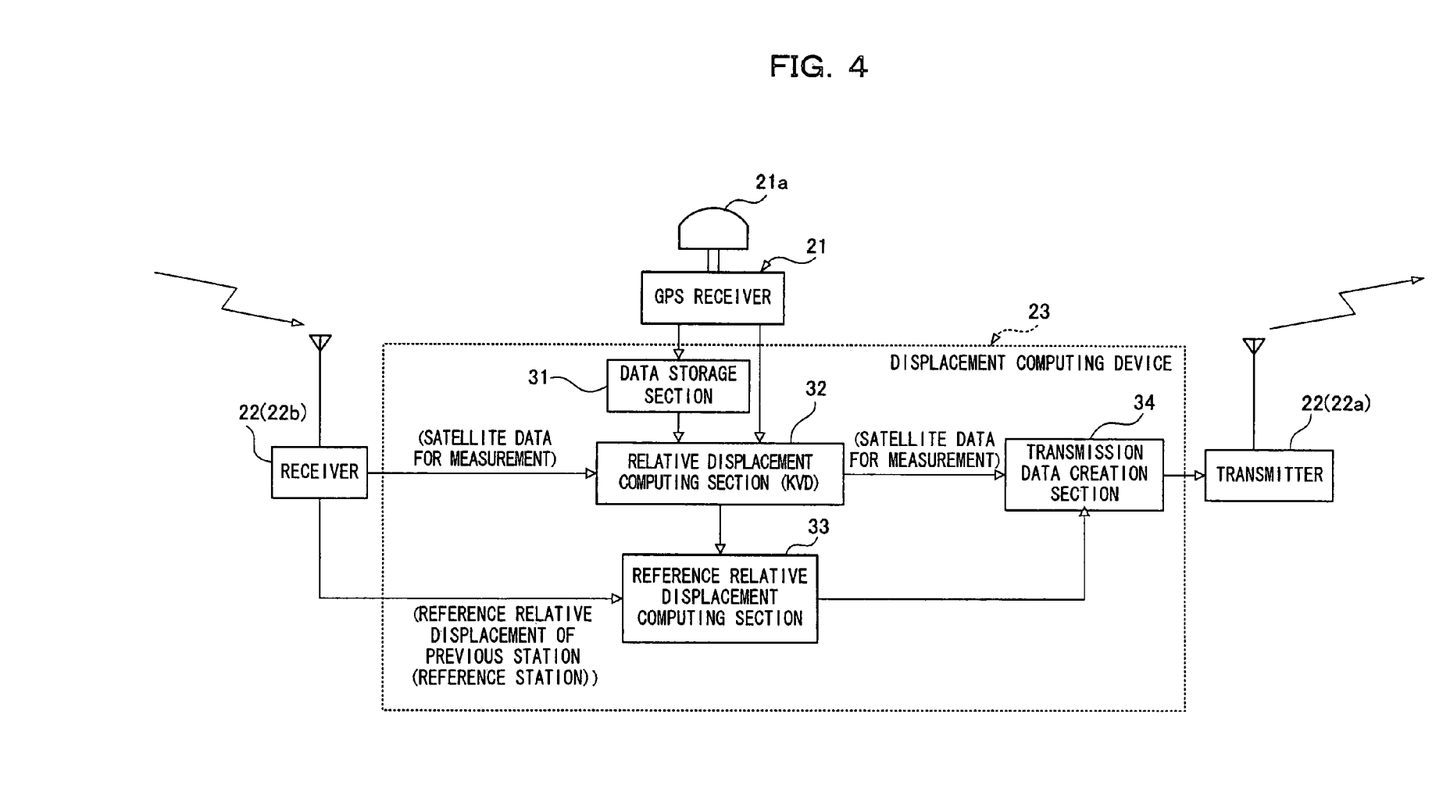
FIG. 4 is a block diagram depicting a general configuration of a displacement computing device installed in the mobile station.

As shown in FIG. 3, each mobile station 3 comprises a GPS receiver (an example of a satellite measurement device) 21 for receiving radio waves from the GPS satellite 4 and measuring the satellite data for measurement, a radio communication device (further comprises a transmitter 22a and receiver 22b, as shown in FIG. 4) 22 which transmits/receives data with other stations 1 and 3, and a displacement computing device 23 for receiving data from the other stations 1 and 3 and performing relative measurement using a KVD system based on the data of the same time in the local station, that is, determining relative displacement of another station from one station.

Now the displacement computing device 23 installed in the mobile station 3 will be described in detail.

As shown in FIG. 4, the displacement computing device 23 comprises a data storage section 31 for storing satellite data for measurement measured by the GPS receiver 21 (including a carrier phase value, distance between satellite and antenna of the receiver (pseudo-distance), orbit information of the satellite, and time series data (GPS time) used for the satellite measurement system), a relative displacement computing section 32 for inputting the satellite data for measurement obtained in the GPS receiver 21, satellite data for measurement from the reference station 1 or previous mobile station (mobile station closer to the reference station in the network, hereafter also called "previous station") 3, and reference relative displacement of the previous station, via the receiver 22b and computing the relative displacement from the previous station using the KVD system, a reference relative displacement computing section 33 for inputting the relative displacement determined by the relative displacement computing section 32 and the reference relative displacement of the previous station and computing the reference relative displacement of the mobile station 3, and a transmission data creation section 34 for inputting the satellite data for measurement of the mobile station 3 stored in the data storage section 31, that is, of the local station, and the reference relative displacement determined by the reference relative displacement computing section 33, and creating the transmission data to be sent to the next mobile station 3. Certainly the transmission data created by the transmission data creation section 34 is sent to the next mobile station 3 via the transmitter 22a. Among the satellite data for measurement, the orbit information is received by the two stations which perform relative measurement respectively, so if the data is obtained only by the GPS receiver 21 of one station, the data may be sent to the other station and used.

Figure 5:
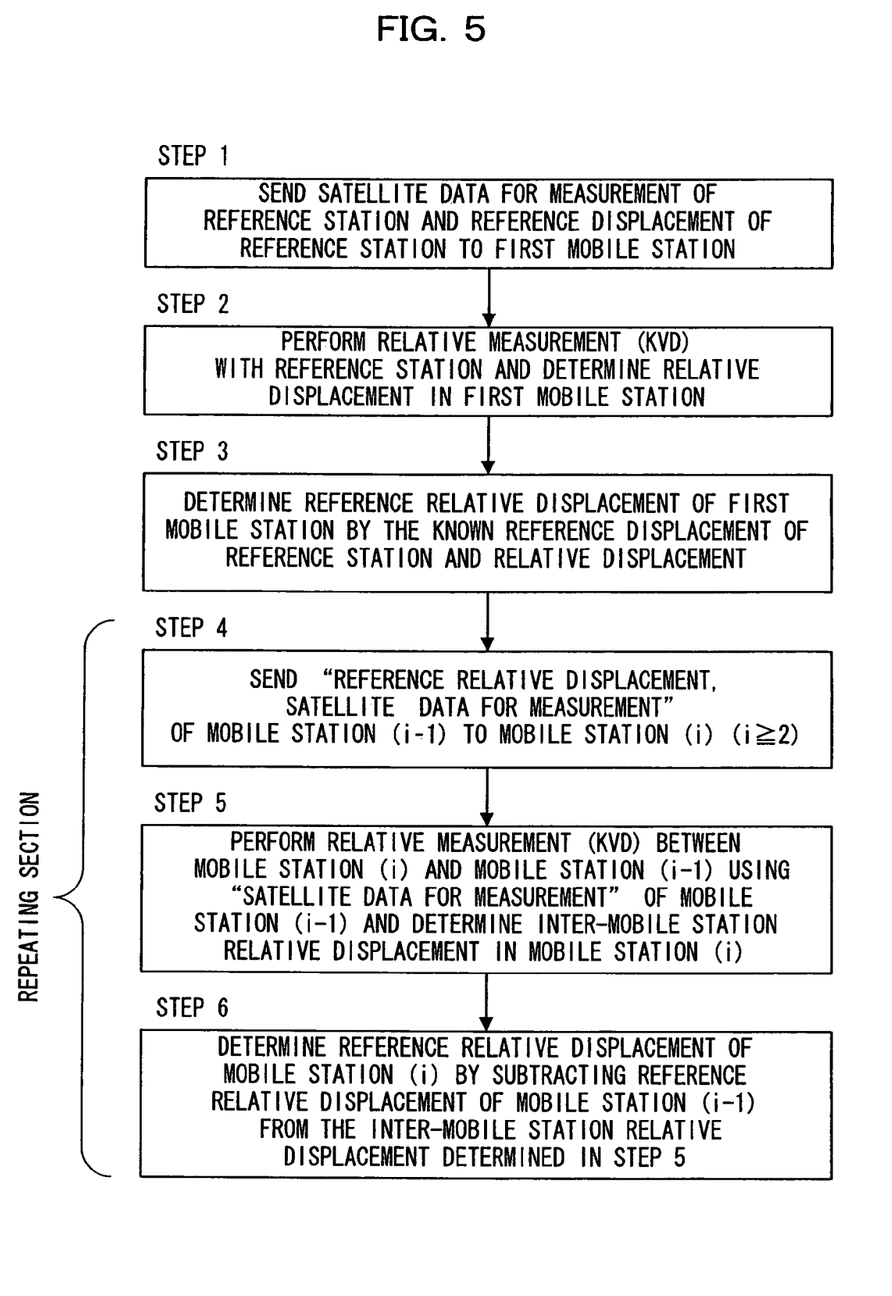
FIG. 5 is a flow chart depicting the relative measurement method in the relative measurement system.

Now a method for determining the displacement of a sea level by determining a relative displacement between each station in this relative measurement system and measuring the reference relative displacement of each mobile station will be described with reference to the flow chart in FIG. 5.

First the satellite data for measurement of the reference station 1 on the land and the reference displacement thereof ("0" if there is no fluctuation, as in the case where the reference station and ground are secured) are sent to the first mobile station 3A on the sea surface (step 1).

Then in the first mobile station 3, the relative displacement viewed from the reference station is determined between the reference station 1 and the first mobile station 3A using the relative measurement based on the KVD system (step 2: reference relative displacement computing step).

Then the reference relative displacement of the first mobile station 3A is determined using the reference displacement of the reference station 1 (step 3).

Then the reference relative displacement of the first mobile station 3A and the satellite data for measurement are sent to the second mobile station 3B.

Then in the second mobile station 3B, the relative measurement based on the KVD system is performed between the first mobile station 3A and second mobile station 3B using the satellite data for measurement, and inter-mobile station relative displacement of the second mobile station 3B viewed from the first mobile station 3A is determined (step 5: inter-mobile station relative displacement computing step).

Then the reference relative displacement of the first mobile station 3A is subtracted from the inter-mobile station relative displacement determined in step 5, and the reference relative displacement of the second mobile station 3B is determined (step 6: conversion step).

When the reference relative displacement of the second mobile station 3B is determined, the above mentioned steps 4 to 6 are repeated, and the reference relative displacement of the third mobile station 3C is determined, and this procedure is repeated until the reference relative displacement of the nth mobile station 3Z, which is most distant from the reference station is determined. In this repeating section (steps 4 to 6), the previous station is indicated as (i−1), and the mobile station, for which reference relative displacement is determined based on the relative measurement, is indicated as (i).

Therefore once the reference relative displacement of each mobile station 3 is determined, this means that the displacement of the floating body 2, that is, the displacement of the sea level at every predetermined cycle, is measured, and the water level fluctuation of the sea surface can be accurately measured, and by removing the wave component and the tidal component from the displacement of the sea level, a tsunami caused by an earthquake, for example, can be accurately measured.

In brief, the relative measurement method of the present invention is a measurement method for forming a relative measurement network for receiving radio waves from satellites by a reference station and a plurality of mobile stations, and performing relative measurement between predetermined stations, and measuring a reference relative displacement, which is a relative displacement of each mobile station viewed from the reference station, wherein at least one of the mobile stations is disposed so as to exceed a base line limit length which allows relative measurement with the reference station, and a space between predetermined mobile stations is set to be the base line limit length which allows the relative measurement or less, and this measurement method has a reference relative displacement computing step for computing a reference relative displacement between the reference station and a predetermined mobile station, an inter-mobile station relative displacement computing step for computing an inter-mobile station relative displacement, which is a relative displacement between the predetermined stations, and a conversion step for converting the inter-mobile station relative displacement determined in the inter-mobile station relative displacement computing step to the reference relative displacement based on the relative displacement of the reference station.

In this way, the reference station 1 is disposed on land, and the mobile stations 3 are sequentially disposed on the sea surface from the reference station 1 with a predetermined space, so as to be the base line limit length which allows relative measurement based on the KVD system or less than the base line limit length, and the relative displacement between each station is determined based on the KVD system, and the reference relative displacement of each mobile station with respect to the reference station is determined using this relative displacement, so the reference relative displacement of a mobile station 3, which is distant from the reference station 1 more than the base line limit length which allows relative measurement, can be accurately determined via the mobile stations 3 disposed therebetween based on the KVD system.

Therefore by disposing each mobile station on a floating body on the sea surface in a sea area distant from the reference station, the existence of a tsunami can be recognized well before reaching shore, so tsunami related damage can be minimized.

Now the above mentioned KVD system will be described briefly.

The KVD system is a precision fluctuation measurement method, and was disclosed in the above mentioned published patent application (2001-281323) in Japan.

The measurement accuracy of the KVD system is close to a real-time kinematic system (hereafter RTK system), so an overview of the KVD system will be described in comparison with the RTK system.

In an RTK system, the three-dimensional coordinates of a measurement target location are determined by determining the carrier phase at the measurement target location while referring to the measured value of the carrier phase from the GPS satellite at a reference point of which latitude, longitude and altitude have been known, and the fluctuation component is measured using the time based fluctuation of the coordinate values. However when the distance between the receiver at the measurement target location and the satellite is determined by the carrier phase, the integer ambiguity must be determined, and to determine the integer ambiguity a large volume of calculations must be executed.

In one KVD system, on the other hand, the relative vector in the reference receiver and the observation receiver, which is installed in an object, is separated into a long cycle fluctuation component, which does not depend on the fluctuation of the object, and a short cycle fluctuation component, which depends on the fluctuation of the object, and the short cycle fluctuation component is represented by each x, y and z axis component of a unit vector from the reference receiver to the satellite, and the carrier phases between at lest three GPS satellites and each receiver are measured, and at the same time, this measurement data is passed through a band pass filter, and the short cycle phase component corresponding to the short cycle fluctuation component of the relative vector is extracted, and at least three inter-receiver single differences between each receiver and each GPS satellite are determined for this short cycle phase component, and based on at least these three inter-receiver single differences, each axis component of the short cycle fluctuation component of the relative vector is computed, and thereby, displacement of an object is measured.

In another KVD system, instead of the above mentioned inter-receiver single differences, at least three inter-receiver and inter-satellite double differences between each receiver and each GPS satellite are determined for the extracted short cycle phase components, and based on at least these three inter-receiver and inter-satellite double differences, each axis component of the short cycle fluctuation component of the relative vector is computed, and displacement of an object is measured.

According to the above KVD methods, focusing only on a short cycle fluctuation component directly related to the fluctuation of the object, each axis component of the short cycle fluctuation component of the relative vector is computed based on the inter-receiver single difference of the short cycle phase component, which is a short cycle fluctuation component of the carrier phase between both receivers and the GPS satellite, or based on the inter-receiver and inter-satellite double difference of the short cycle phase component, so fluctuation of the object can be measured without determining the integer ambiguity. The KVD system, which uses a kinematic system, can measure several tens of Hertz of vibration of an object, such as the vibration of a building structure, the vibration of a machine structure or the fluctuation of sea level.

Figure 6:
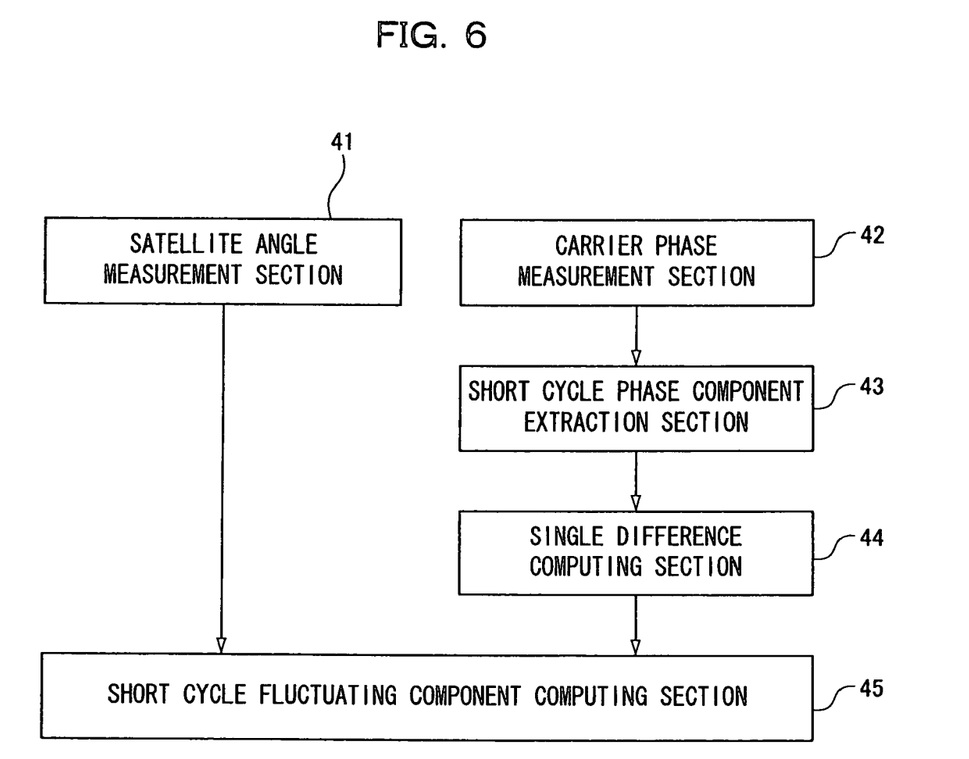
FIG. 6 is a block diagram depicting the general configuration of the displacement measurement device in the relative measurement system.

Now a general configuration of a displacement measurement device using one KVD system will be described with reference to FIG. 6.

This displacement measurement device comprises a satellite angle measurement section 41 for receiving radio waves transmitted from a GPS satellite, and measuring an altitude angle $\phi elv$ and azimuth $\phi azm$ of the satellite from the data included in the navigation message, a carrier phase measurement section 42 for measuring a carrier phase (phase distance) $\phi$, a short cycle phase component extraction section 43 for passing the carrier phase $\phi$ measured by the carrier phase measurement section 42 through a band pass filter, and extracting a short cycle phase component $\phi S$ which is a time-based fluctuation component, a single difference computing section 44 for determining the inter-receiver single difference $\Delta\phi S$ of the short cycle phase component $\phi S$ extracted by the short cycle phase component extraction section 43, and a short cycle fluctuation component computing section 45 for inputting an altitude angle $\phi elv$ and azimuth $\phi azm$ from the satellite angle measurement section 1 and an inter-receiver single difference $\Delta\phi S$ from the single difference computing section 44 respectively to create at least three equations, and solving these simultaneous equations to compute the short cycle fluctuation component $\Delta rS$ of the relative vector $\Delta r$.

In the description of the above embodiments, the displacement computing device is disposed in each mobile station, and the reference relative displacement of each mobile station is determined, but these reference relative displacements are transmitted along with a station number to an observatory (may also be used as a reference station) on land by a transmitter 22a and centrally controlled there.

On the other hand, the displacement computing device may be disposed in the reference station, for example, so that the satellite data for measurement, which each mobile station measured, is transmitted to and stored in the reference station, and the reference relative displacement of each mobile station may be determined by the displacement computing device of the reference station.

In other words, the inter-mobile station transmission data in the above mentioned embodiment is transmitted to the reference station, and the data of each mobile station is stored in the reference station, and relative measurement is performed using the stored data using the same functions as the relative displacement computing section and reference relative displacement computing section of the mobile station.

Figure 7:
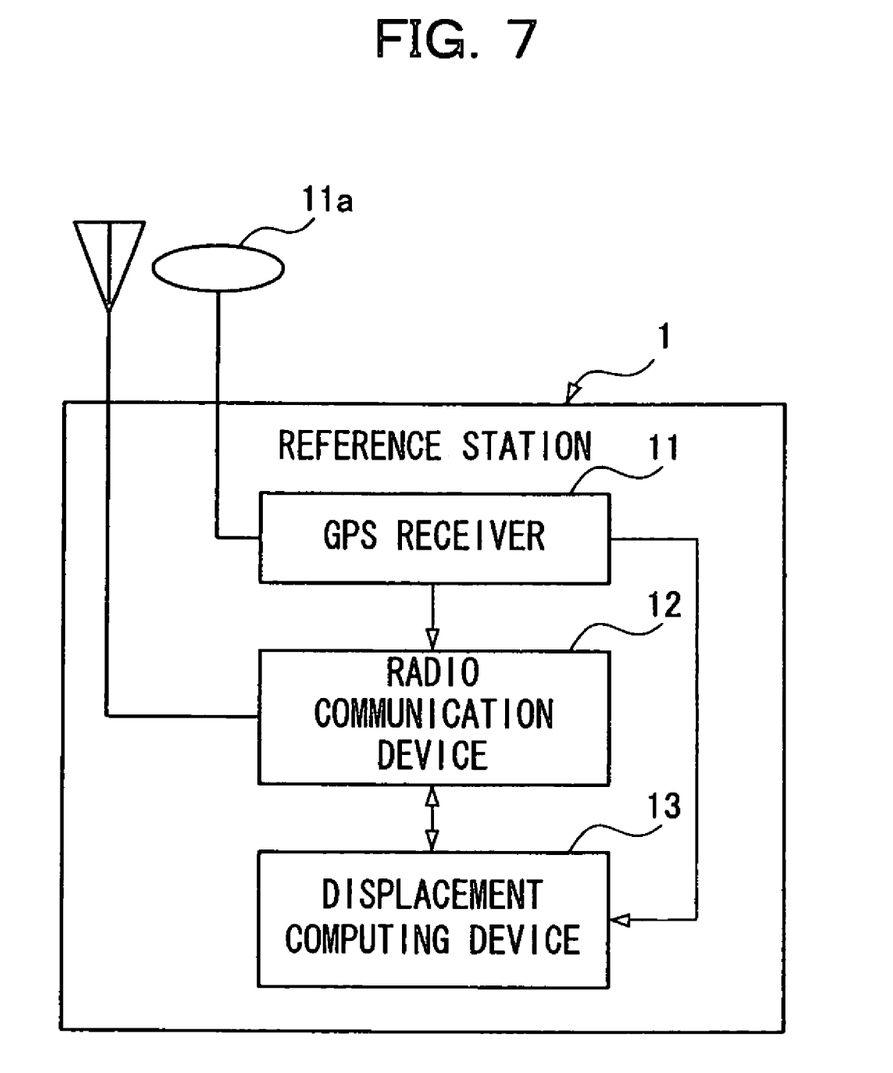
FIG. 7 is a block diagram depicting a general configuration of the reference station according to a variant form of the relative measurement system.
Figure 8:
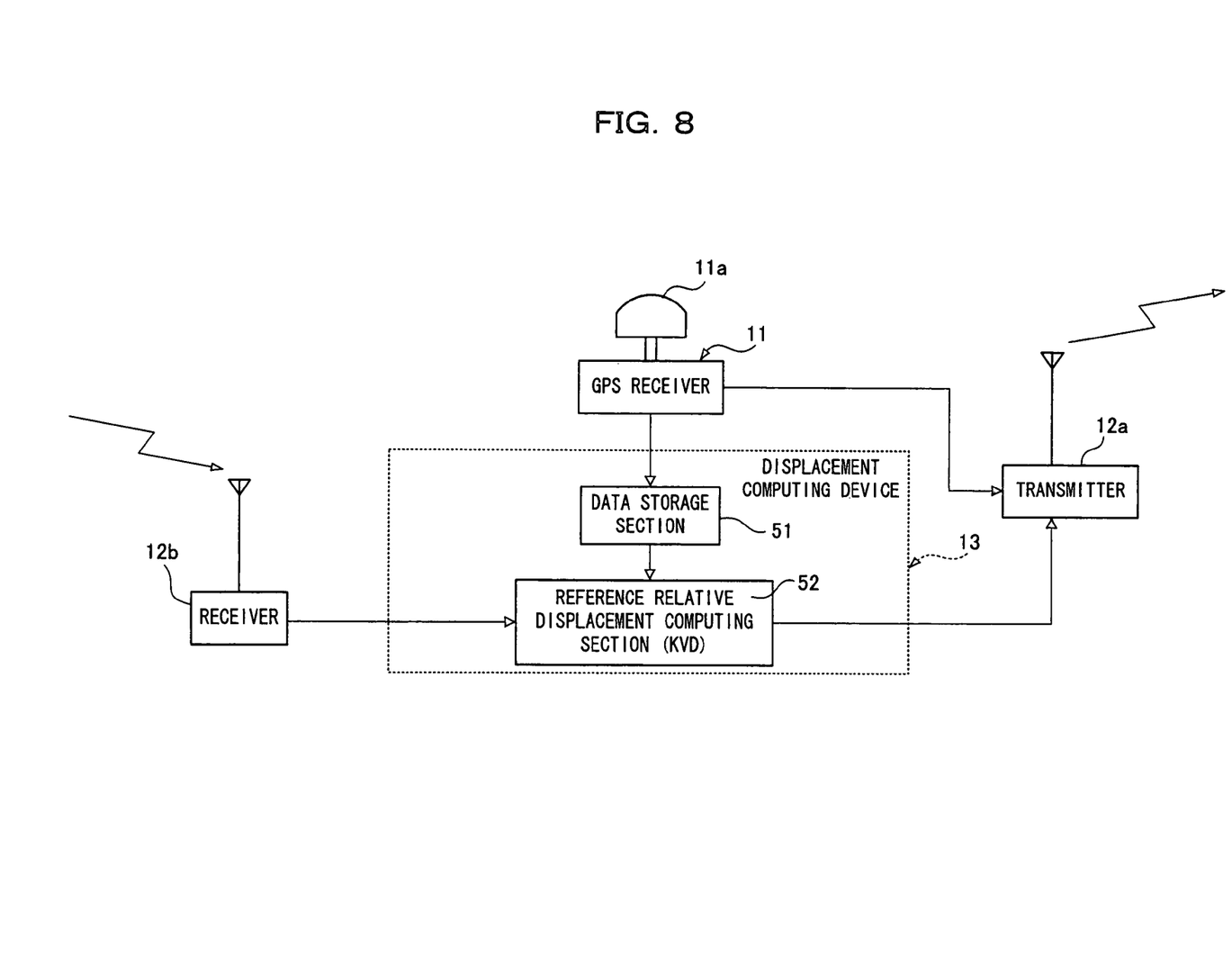
FIG. 8 is a block diagram depicting a general configuration of the position measurement computing device installed in the reference station according to a variant form of the relative measurement system.

In this case, the reference station 1 comprises displacement computing device 13, as shown in FIG. 7, and the displacement computing device 13 further comprises a data storage section 51 for storing at least satellite data for measurement from the GPS receiver 11 and satellite data for measurement received by each mobile station 3 via the receiver 12b of the radio communication device 12, and a reference relative displacement computing section 52 for inputting the satellite data for measurement stored in the data storage section 51 and computing the reference relative displacement of each mobile station 3 with respect to the reference station 1, as shown in FIG. 8.

In the description of the above embodiment, data between each station is transmitted/received by the radio communication device, but if communication by ground waves cannot be performed due to visual limitations, data can be transmitted/received via the communication satellite.

Also in the above embodiment, the reference station is disposed on land, but may be disposed on a floating body on the sea surface.

Also in the description of the above embodiment, the reference station is disposed on land and the mobile stations are disposed on the sea surface so as to measure waves and tsunami, but if both the reference station and mobile stations are disposed on land, the relative measurement system can also be used as a seismograph, for example.

Also in the above embodiment, satellite measurement based on GPS was used as an example, but the present invention can also be applied to a satellite measurement system (satellite position measurement system) based on the same principle, or which will appear in the future.

INDUSTRIAL APPLICABILITY

According to the relative measurement method and relative measurement system of the present invention, accurate measurement is possible using a relative measurement based on a KVD system, even for a mobile station installed at a position exceeding the base line limit length which allows relative measurement from the reference station, and by mooring a floating body on which a mobile station is installed in a sea area quite distant from land, for example, a tsunami can be measured offshore and the coming of the tsunami can be forecasted, and the damage of the tsunami can be decreased. In some cases, the relative measurement system can also be used as a seismograph.

The invention claimed is:

1. A relative measurement method for forming a relative measurement network for performing a relative measurement between predetermined stations by receiving radio waves from satellites by a reference station and a plurality of mobile stations, and measuring a reference relative displacement, which is a relative displacement of each mobile station viewed from the reference station,
wherein at least one of said mobile stations is disposed so as to exceed a base line limit length that allows relative measurement with the reference station, and a space between predetermined mobile stations is set to be a base line limit length that allows relative measurement or set to be less than the base line limit length,
the relative measurement method comprising:
a reference relative displacement computing step of computing a reference relative displacement between the reference station and the predetermined mobile station;
an inter-mobile station relative displacement computing step of computing an inter-mobile station relative displacement, which is a relative displacement between said predetermined stations; and
a conversion step of converting the inter-mobile station relative displacement determined in said inter-mobile station relative displacement computing step into the reference relative displacement based on a reference displacement of said reference station,
wherein a relative vector indicating a displacement of the mobile station from the reference station is separated into a long cycle fluctuation component, which does not depend on a fluctuation of the mobile station, and a short cycle fluctuation component, which depends on the fluctuation of the mobile station, and the short cycle fluctuation component is represented by each x, y and z axis component of a unit vector from the reference station to the satellite, and carrier phases between at least three satellites and each receiver are measured, and at the same time, this measurement data is passed through a band pass filter, and a short cycle phase component corresponding to the short cycle fluctuation component of the relative vector is extracted, and a least three inter-receiver single differences or inter-receiver and inter-satellite double differences between each receiver and each satellite are determined for this short cycle phase component, and based on at least three single differences or double differences, each axis component of the short cycle fluctuation component of the relative vector is computed, and thereby, the relative displacement is measured.

2. A relative measurement system for forming a relative measurement network for performing a relative measurement between predetermined stations by receiving radio waves from satellites by a reference station and a plurality of mobile stations, and measuring a reference relative displacement, which is a relative displacement of each mobile station viewed from the reference station,
wherein at least one of said mobile stations is disposed so as to exceed a base line limit length that allows relative measurement with the reference station, and a space between predetermined mobile stations is set to be a base line limit length that allows relative measurement or set to be less than the base line limit length,
a satellite measurement device for receiving radio waves from satellites is installed in each of said stations,
a radio communication device for transmitting and receiving data to/from a predetermined station is installed in each of said stations, and
the relative measurement system is provided with a relative displacement computing section for computing a relative displacement between said predetermined stations, and a reference relative displacement computing section for determining a reference relative displacement of another mobile station based on a reference relative displacement of one station that performs the relative measurement,
the relative displacement measurement device comprising:
a short cycle phase component extraction section for passing a carrier phase indicating a distance between the satellite and the mobile station obtained by the satellite measurement device through a band pass filter, and extracting a short cycle phase component which is a time-based fluctuation component;
a difference computing section for determining an inter-receiver single difference or inter-receiver and inter-satellite double difference of the short cycle phase component extracted by the short cycle phase component extraction section; and
a short cycle fluctuation component computing section for inputting an altitude angle and azimuth of the satellite obtained by the satellite measurement device and the inter-receiver single difference or inter-receiver and inter-satellite double difference obtained by the difference computing section respectively to create at least three equations, and solving these simultaneous equations to compute a short cycle fluctuation component of a relative vector.

3. The relative measurement system using satellites according to claim 2, wherein the reference relative displacement computing section is disposed in the reference station, and the reference relative displacement of the mobile station is sequentially determined.

4. The relative measurement system using satellites according to claim 2, wherein the reference relative displacement computing section for computing each reference relative displacement is disposed in each mobile station.

5. The relative measurement system using satellites according to claim 2, wherein the relative measurement is performed using a carrier phase.

* * * * *